INVENTOR,
BRUCE BURNS
BY HIS ATTORNEYS;
HARRIS, KIECH, FOSTER & HARRIS

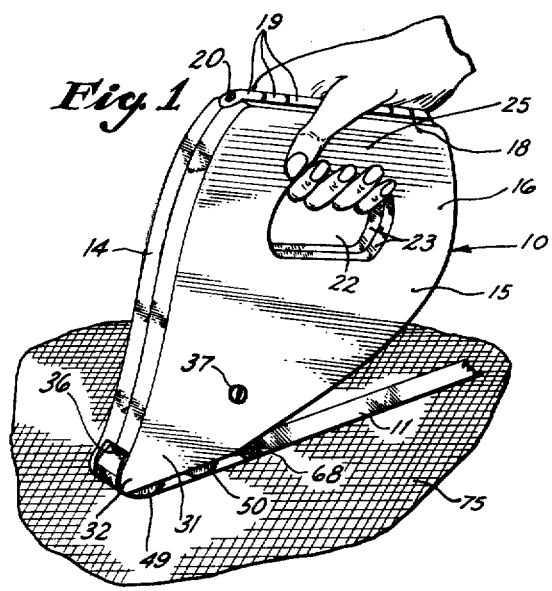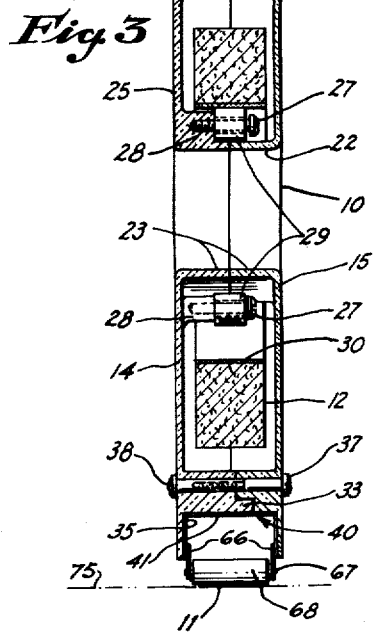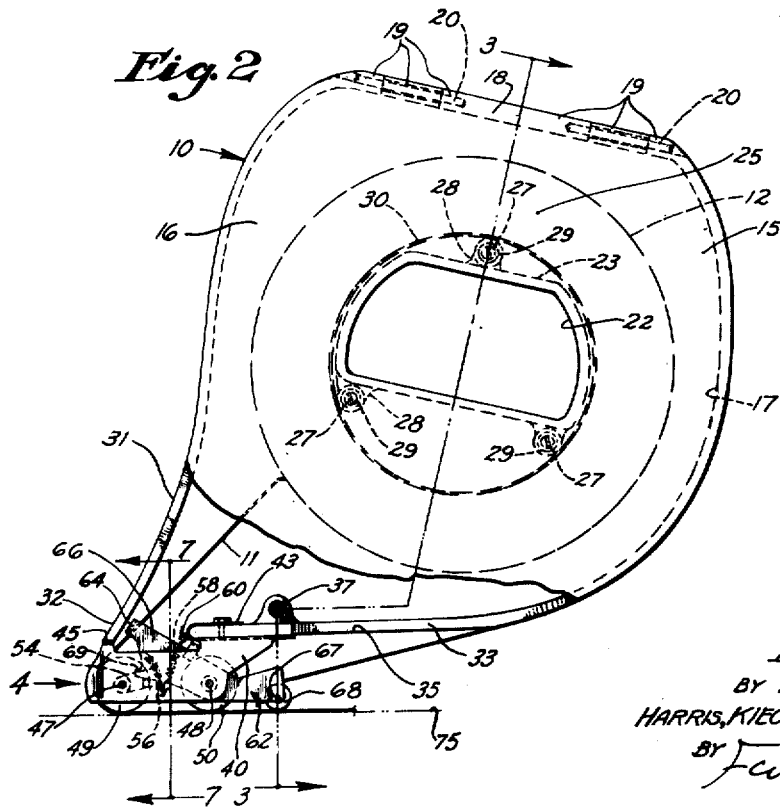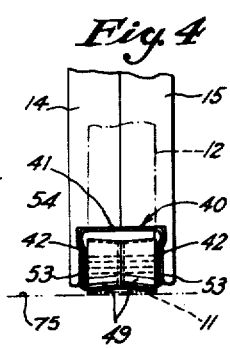

Patented Jan. 10, 1950

2,493,737

UNITED STATES PATENT OFFICE 2,493,737

DEVICE FOR APPLYING ADHESIVE TAPE

Bruce Burns, Los Angeles, Calif.

Application July 2, 1946, Serial No. 681,097

14 Claims. (Cl. 216—29)

My invention relates to devices for applying adhesive tape and particularly to a device adapted to dispense and apply masking and like tape to surfaces.

Various devices are employed for dispensing adhesive tape and cutting off lengths of such tape for use in sealing packages and for similar purposes. Such devices usually comprise means for supporting a roll of the adhesive tape and a guide element having a cutting edge across which the tape is drawn to be dispensed. The tape is unwound from the roll either manually or through means of suitable manually-operated mechanism which feeds predetermined lengths of the tape and severs the lengths from the remainder of the supply. When the tape is to be employed as a means for masking or covering portions of surfaces which are to be painted, the dispensed tape is applied manually to the areas to be concealed and this requires a laborious and painstaking operation and adds considerably to the over-all cost of the painting process. For example, when an automobile is to be painted with spray-gun equipment, the parts of the car body which are to remain unpainted are first concealed by means of tape having one side coated with a very slow drying and setting adhesive, that is, adhesive requiring no moistening. After the exposed surfaces of the automobile body have been sprayed in the usual manner, the masking tape is removed by peeling it off, thus leaving a sharp edge between the painted and unpainted areas. Such self-adhering tape is used for other purposes and my invention is not to be considered as limited to any particular use to which it might be applied. Tape dispensers previously employed are of a stationary type, the tape being drawn off from the supply roll, cut to a desired length and the severed length transferred manually to the surface to which it is to be affixed by hand and it is a well-known fact that the tape often adheres to the hands of the person applying the tape and to objects adjacent the surface and this presents a very undesirable condition and complicate the operation.

It is a prime object of my invention to provide a tape applying device of a portable type adapted to dispense and apply self-adhering tape to surfaces by the simple act of pressing the end of the tape against the surface and moving the device along the surface to cause the tape to be automatically unwound from the supply roll and applied to the surface.

Another object is to provide a device of the character referred to having a positive and efficient perforating means for severing the strip of tape after it has been applied to a surface, this means being conveniently operated by simply tilting the device to perforate the tape and continuing the forward movement of the device to cause the applied strip of tape to be severed from the remainder of the tape on the roll.

Another object is to provide a device of the type indicated having a hollow casing within which a relatively large roll of adhesive tape is adapted to be rotatably held, the casing being composed of two complementary sections hingedly connected together to adapt the casing to be readily opened for insertion of the roll of tape.

Another object is to provide a device of the type specified having a casing which may be molded from transparent plastic material to permit observation of the roll of tape so that the amount of tape remaining on the roll may be readily determined.

Another object is to provide a device of the class identified which is adapted to be operated while held in one hand of the operator so that the other hand of the operator is left free to perform other duties, thereby simplifying the operation and insuring a more uniform application of the tape to the surface.

Another object is to provide a tape applying device which is simple in construction, being composed of a minimum number of parts adapted for economical manufacture, and one which is light in weight, durable in use and highly efficient in performing its intended function.

Further objects of my invention will appear from the following specification and the drawings, which are intended for the purpose of illustration only, and in which:

Fig. 1 is a small-scale perspective view of my tape applying device, illustrating the manner of applying it to use;

Fig. 2 is an enlarged side elevational view of the device;

Fig. 3 is a cross-sectional view through the device taken on the irregular line 3—3 of Fig. 2;

Fig. 4 is a fragmentary elevational view of the lower portion of the device viewed in the direction of arrow 4 in Fig. 2;

Figure 5:
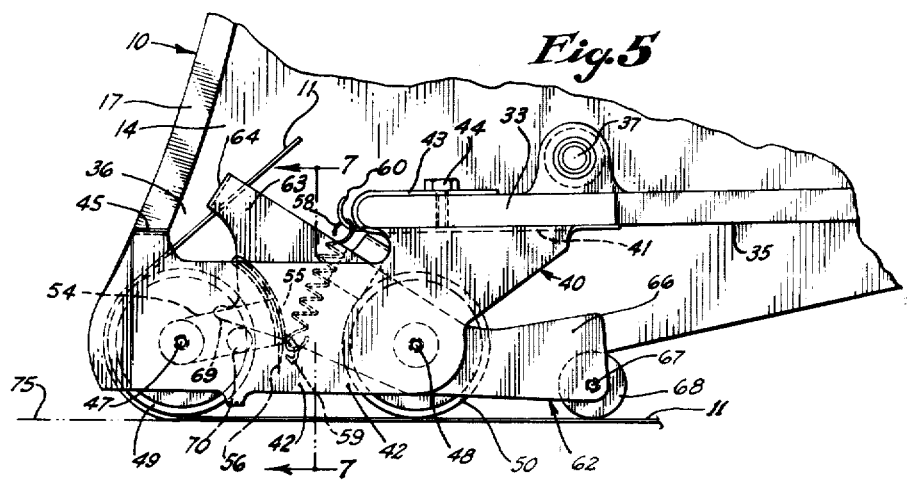
Fig. 5 is a further enlarged side elevational view of the front end of the device showing the relationship of the parts during the tape applying operation.

Referring to the drawings in detail, my tape applying device comprises essentially a hollow casing 10 for containing a roll 12 of adhesive tape 11. The casing 10 is composed of two mating halves or sections 14 and 15, each section having a substantially circular wall 16 which is bounded by an inwardly directed rim portion 17, the rim portions of the two sections being normally in abutting relation as shown in Fig. 3 to complete the hollow casing structure. Adjacent one end of the circular wall portion 16 the abutting rim portions 17 are made straight as indicated at 18 and these straight portions are provided with interengaging hinge ears 19 between which extend hinge-pins 20 to adapt the sections to be relatively pivoted to open the casing. The sections 14 and 15 are provided at the center of their circular walls 16 with aligned openings 22 bounded by inwardly directed flanges 23, the flanges of the two sections abutting as shown in Fig. 3. The upper portions of the sections 14 and 15 between the openings 22 and the straight portions 18 together constitute a hand-hold or grip 25 to permit the device to be held in one hand of the operator in the manner illustrated in Fig. 1. Studs 27 are screwed into bosses 28 provided within the section 14 and arranged equi-distant from the theoretical center of its opening 22 and rotatable on the studs 27 are rollers 29. The rollers 29 form, in effect, a three-point mounting for the roll 12 of adhesive tape 11 which is placed in position with its annular cardboard core 30 embracing the rollers. Through this mounting means the roll 12 is adapted to rotate freely within the casing 10 to permit the tape 11 to be unwound therefrom.

At the bottom of the casing 10 the side walls 16 of the sections 14 and 15 are extended in triangular portions 31 with the rim portions 17 converging as shown in Fig. 2 to provide a pointed end or nose 32. As shown in Figs. 2 and 3, one of the converging rim portions 17 extends substantially horizontal when the device is held in the position herein shown thereby providing a shelf 33. The triangular portions 31 project downwardly below the horizontal shelf 33 and cooperate with the shelf in providing a channel 35 in which the mechanism for feeding, applying and severing the tape is disposed. The forward end of the shelf portion 33 is spaced from the rim of the opposite side of the casing to provide an opening 36. The two sections 14 and 15 of the casing 10 may be held in closed relation by means of a screw 37 on the section 15 which is screwed into a sleeve nut 38 on the other section 14 (Fig. 3).

Figure 6:
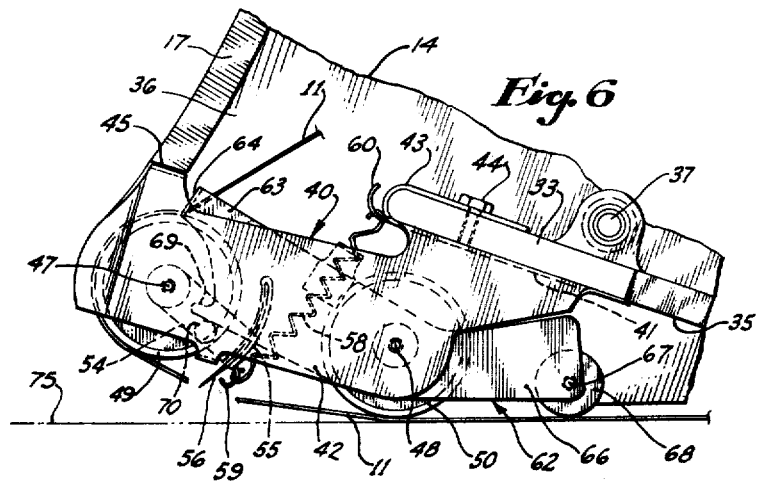
Fig. 6 is a view similar to Fig. 5 illustrating the manner in which the applied tape is severed from the remainder of the tape on the supply roll.
Figure 7:
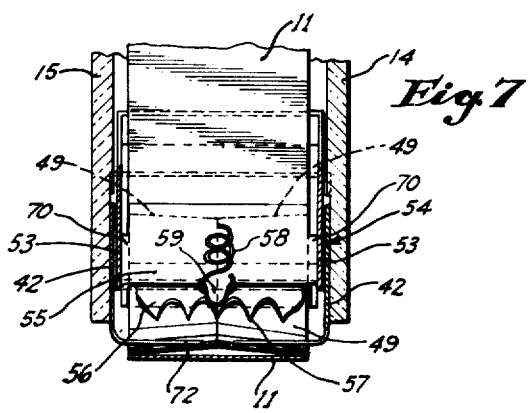
Fig. 7 is a cross-sectional view taken on line 7—7 of Fig. 2 and showing the tape severing means.

Disposed within the channel 35 is a sheet metal frame 40 of inverted U shape having a top portion 41 and depending side portions 42. The top portion 41 is slit longitudinally and laterally to provide a tab 43 which is folded rearwardly to overlie the top of the shelf 33 to which it is secured by means of a screw 44 to secure the frame in place. A transverse strip 45 is provided at the forward end of the top portion 41 for the purpose of retaining the unwinding tape 11 in the correct position in the manner to be later explained. The side portions 42 have aligned holes for receiving a pair of pins 47 and 48, the opposite ends of the pins being headed over against the frame to hold them in place. Rotatably mounted on the pin 47 between the side portions 42 is a pair of rollers 49. As shown in Fig. 6 the rollers 49 are slightly tapered with the ends of larger diameter disposed adjacent the side portions 42. A similar pair of tapered intermediate rollers 50 are rotatably mounted on the pin 48 (Fig. 2). The forward and intermediate rollers 49 and 50 are adapted to roll upon a surface during the application of the adhesive tape 11 to the surface and each pair of rollers is of a width substantially equal to the width of the tape to adapt it to press the edge of the tape firmly against the surface. Each of the rollers is constructed in two halves to facilitate movement of the device in arcuate and irregular paths and to avoid stretching and breaking the tape due to slippage between the rollers and tape.

Pivotally mounted on the pin 47 between the rollers 49 and the side portions 42 are opposite legs 53 of a U-shaped blade holder member 54. The holder member 54 has a cross strip 55 to which a tape-severing blade 56 is secured in any suitable manner. The blade 56 projects downwardly from the strip 55 and its lower edge is preferably provided with sharpened pointed teeth 57 which are adapted to pierce or perforate the tape 11 in the manner and for the purpose to be later explained. The blade holder 54 is normally held in the elevated position shown in Fig. 5 by means of a spring 58 having one end connected to a tab 59 on the holder member and its other end secured to a similar tab 60 on the top portion of the frame 40.

The blade holder member 54 and its attached blade 56 are adapted to be pivoted downwardly to the position shown in Fig. 6 by means of a blade actuating member 62. The actuating member 62 is constructed in the form of a sheet metal lever provided with side portions 63 joined at the forward end by a connecting strip 64 under which the tape 11 leads to the forward rollers 49. The side portions 63 are pivoted on the transverse pin 48 and extend rearwardly to provide arms 66 between which a pin 67 extends to rotatably mount a roll 68 of relatively small diameter. Each of the side portions 63 is provided with a forwardly projecting finger 69 which overlies a circular lug 70 on each of the legs 53 of the blade holder member 54. The lower edges of the side portions 42 of the frame 40 may be provided with fingers 72 which are bent inwardly at a point adjacent the periphery of the forward rollers 49 to serve as a guard in preventing the tape 11 from wrapping around said rollers. The complete tape applying device having been described in detail, the method of operation thereof will be next explained.

To prepare the device for operation, the screw 37 is removed and the two sections 14 and 15 pivoted on the hinge pins 20 to open position. A roll 12 of adhesive tape 11 is then placed in the section 14 with its core 30 freely rotatable on the rollers 29. The leading end of the tape 11 is then drawn off from the roll 12 and passed under the connecting strip 64 of the actuating member 62 drawn out through the opening 36, and rearwardly around the roller 49 to a position intermediate of roller 49 and roller 50. With the end of the tape 11 thus projecting from the nose 32 of the device, the sections 14 and 15 are folded together to closed position and the screw 37 inserted and tightened to hold the sections in closed relationship.

While tape having one side coated with a very slow drying and setting adhesive is used for many purposes such as sealing cartons, attaching sheet material to various objects and for other purposes, the operation of the device in applying tape to parts of a surface which are to be masked will be explained as an example of one use to which the present device may be applied. When automobiles and other vehicles are to be painted with the use of a spray-gun, it is necessary to cover portions of the vehicle body which must remain unpainted and the masking of such areas is usually accomplished by drawing off lengths of tape from a roll and applying them to the areas. This requires special care and skill and thus the preparation of the vehicle body for painting requires considerable time and increases the overall cost of the painting of the vehicle. Moreover, masking tape is usually of a crinkled nature and unless the edges of the tape are pressed firmly against the surface, the sprayed paint is apt to flow under the tape, thus causing a poorly defined or uneven edge of the painted area which is conspicuous when the tape is removed.

My tape applying device was designed particularly as a means for facilitating the application of adhesive tape to areas which are to be masked. To apply the tape 11 to an area 75, the device is grasped in the hand of the operator in the manner indicated in Fig. 1 and, with the non-adhesive side of the leading end of the tape partially encircling the forward roller 49 and extending rearwardly from this roller, the device is disposed with the end of the tape against the surface to be masked and with the roller 49 pressing the tape firmly against the surface. By moving the device forwardly and simultaneously pressing the roller 49 against the surface 75, the tape 11 is unwound from the roll 12 which is rotated by this action, and applied to the surface. It is to be particularly noted that during the application of the tape 11, the outer enlarged portions of the pair of rollers 49 act to press the tape into firm engagement with the surface 75 and iron out the wrinkles at the edges of the tape. It will be apparent that the dual construction of the roller 49 permits the tape 11 to readily follow a curved or irregular line and thus the danger of the tape being broken or its edges folded or raveled is entirely avoided. The device may rest upon both rollers 49 and 50 during the application of the tape in a straight line but when the tape is to follow an irregular course it is often advantageous to use only the forward roller 49.

After a length of the tape 11 has been dispensed and affixed to the surface 75, the device is tilted rearwardly as shown in Fig. 6 to cause pressure to be exerted against the roll 68 to effect relative pivotal movement between the roll and the casing 10, the roll 68 and actuating member 62 remaining in initial position and the other parts pivoting with respect thereto as shown in Fig. 6. As the casing 10 is thus pivoted on the axis 48 of the roller 50 and its forward end elevated, the blade holder 54 is prevented from pivoting upwardly due to the engagement of its lugs 70 with the fingers 69 of the actuating member 62. The resulting relative pivotal movement between the blade holder 54 and casing 10 causes the cutter-blade 56 to project downwardly below the casing against the action of the spring 58 and its pointed teeth 57 thus are forced through the strip of tape 11 which is tensioned between the rollers 49 and 50. The engagement of the relatively long arms 63 of the actuating member 62 with the lugs 70, which are located at a comparatively short radial distance from the pivot 47, causes the blade holder 54 to be pivoted at a greater angular velocity than the casing 10 as the latter is tilted rearward and thus the cutter-blade 56 is projected rapidly from the casing. Through this provision, a very slight tilting movement of the casing 10 is sufficient to actuate the tape perforating means and thus the tape severing operation is greatly facilitated. The connecting strip 64 is adapted to engage the length of tape extending between the roll 12 and roller 49 to further tension the tape to insure positive penetration of the teeth 57 through the tape. With the tape 11 thus perforated, the device is moved forwardly in its inclined position (Fig. 6) to break the portions of the tape between the perforations. In this manner the strip of tape 11 which has been applied to the surface 75 is severed from the remainder of the tape on the supply roll 12. As pressure upon the device is relieved, the spring 58 acts to return the parts of the tape severing mechanism to inoperative position as shown in Figs. 2 and 5 so that the device may again be used to apply another strip of tape to the same or other surface.

It is to be noted that the tape 11 is severed at a point rearwardly of the forward roll 49 so that a length of tape is always available for attachment to a surface and it is therefore unnecessary to manually withdraw a length from the roll for such purpose. The length of tape which projects from the device curves rearwardly and downwardly from the forward roller 49 due to the fact that it has been tensioned by the roller 49. The projecting end of the tape 11 thus is invariably disposed in a position to be attached to a surface. The tape applying operation is thus greatly facilitated and may be carried out with the use of only one hand, leaving the other hand free to perform other operations such as holding a sheet of paper which is to be secured to a surface being masked. The device is semi-automatic, it being only necessary to move the device along a surface while pressing the roller 49 against the surface to apply the tape and to merely tilt the device and continue its forward motion to sever the strip of tape from the remainder of the tape on the supply roll 12. As another feature, the improved tape applying device employs a pair of guiding rollers 49 instead of a one-piece roller thereby insuring against breaking or puckering of the tape when it is applied in an irregular or curved line. Moreover, the tape guiding rollers 49 are of frusto-conical shape to provide tape-ironing portions at their outer ends adapted to press the edges of the tape into firm engagement with a surface and to iron out wrinkles occurring in the tape.

Although I have shown the tape applying device as embodied in a preferred form of construction, by way of example, it will be understood that it may be modified in various particulars without departing from the spirit of the invention. Consequently I do not desire to be limited by the foregoing specification, but desire to be afforded the full scope of the appended claims.

I claim as my invention:

1. A device for applying adhesive tape to a surface, including: a hollow casing provided with an opening; means for rotatably supporting a roll of tape within said casing to adapt the tape to be unwound from said roll, the end of said tape passing outwardly through said opening; and a roller rotatable on said casing adjacent said opening over which said tape is adapted to pass to said surface, said roller being of a width substantially equal to the width of said tape and being of gradually decreasing diameter toward its mid-portion to provide peripheral flanges at its ends, said flanges being of greater diameter than the portion of said roller intermediate said ends and adapted to press the edges only of said tape into firm engagement with said surface when the device is moved along said surface.

2. A device for applying adhesive tape to a surface, including: a hollow casing provided with an opening; means for rotatably supporting a roll of tape within said casing to adapt the tape to be unwound from said roll, the end of said tape passing outwardly through said opening; and a roller rotatable on said casing adjacent said opening over which said tape is adapted to pass to said surface, said roller being composed of at least two axially aligned elements relatively rotatable with respect to one another and adapted to engage and press only the edges of said tape into firm engagement with said surface when said device is moved along said surface.

3. A device for applying adhesive tape to a surface, including: a hollow casing provided with an opening; means for rotatably supporting a roll of tape within said casing to adapt the tape to be unwound from said roll, the end of said tape passing outwardly through said opening; and a roller of a width substantially equal to the width of said tape and rotatable on said casing adjacent said opening and over which said tape is adapted to pass to said surface, said roller being composed of a pair of axially aligned elements relatively rotatable with respect to each other and said elements being of frusto-conical form with their bases disposed at opposite ends of said roller and said bases being adapted to engage and press only the edges of said tape into firm engagement with said surface when said device is moved along said surface.

4. A device for applying adhesive tape to a surface, including: a hollow casing composed of two sections hinged together to adapt said casing to be opened and closed, said sections each having means together defining a transverse opening of substantially trapezoidal shape in said casing through which the fingers of an operator can extend and a straight hand grip portion by which the device can be supported by the operator; a plurality of mounting means spaced around said opening within one of said sections for rotatably mounting a roll of said tape to adapt said tape to be unwound therefrom; fastening means for retaining said sections in closed relationship, said sections being provided with cooperating openings through which said tape is adapted to pass from said roll; and a roller rotatable on said casing adjacent said openings over which said tape is adapted to pass to said surface, said roller being adapted to press said tape against said surface when the device is moved along said surface.

5. A device as defined in claim 4 in which said mounting means for said roll consists of a plurality of equidistantly spaced rollers upon which said roll of tape is rotatably mounted.

6. A device as defined in claim 4 in which said casing sections are provided with internal flanges providing aligned openings together forming said transverse opening through which the fingers of an operator may extend to enable said casing to be held in the hand of the operator.

7. A device applicator for applying adhesive tape to a surface, inculding: a hollow casing provided with an opening; means for rotatably supporting a roll of tape within said casing to adapt the tape to be unwound from said roll, the end of said tape passing outwardly through said opening; a roller rotatable on said casing adjacent said opening over which said tape is adapted to pass to said surface, said roller having peripheral flanges at its ends adapted to pass said tape against said surface when the device is moved along said surface; and means pivoted to and responsive to pivotal movement of said casing with respect to said surface for severing lengths of said tape applied to said surface from the remainder of tape on said roll.

8. A device for applying adhesive tape to a surface, including: a hollow casing provided with an opening; means for rotatably supporting a roll of tape within said casing to adapt the tape to be unwound from said roll, the end of said tape passing outwardly through said opening; a roller rotatable on said casing adjacent said opening over which said tape is adapted to pass to said surface, the said roller having peripheral flanges at its ends adapted to engage and press only the edges of said tape against said surface when the device is moved along said surface; and tape severing means pivoted on said casing and adapted to be pivoted in response to tilting movement of said casing with respect to said surface, said severing means being adapted upon relative pivotal movement between said severing means and said casing in one direction to sever the length of tape applied to said surface from the remainder of said tape on said roll.

9. A device for applying adhesive tape to a surface, including: a hollow casing provided with an opening; means for rotatably supporting a roll of tape within said casing to adapt the tape to be unwound from said roll, the end of said tape passing outwardly through said opening; a roller rotatable on said casing adjacent said opening over which said tape is adapted to pass to said surface, said roller having peripheral flanges at its ends adapted to press said tape against said surface when the device is moved along said surface; tape severing means pivoted on said casing and adapted upon relative movement between said severing means and said casing in one direction to sever the length of tape applied to said surface from the remainder of said tape on said roll; an actuating member pivoted on said casing and adapted to pivot said tape severing means; and a roll rotatable on said actuating member and engageable with said surface, said roll being operative to effect relative pivotal movement between said casing and said actuating member when said casing is tilted with respect to said surface to actuate said tape severing means.

10. A device for applying adhesive tape to a surface, including: a hollow casing provided with an opening; means for rotatably supporting a roll of tape within said casing to adapt the tape to be unwound from said roll, the end of said tape passing outwardly through said opening; a roller rotatable on said casing adjacent said opening over which said tape is adapted to pass to said surface, said roller being adapted to press said tape against said surface when the device is moved along said surface; a holder member pivoted within said casing and provided with tape severing means; lugs on said holder member; an actuating member pivoted on said casing and engageable with said lugs to effect relative pivotal movement between said holder member and said casing in a direction to cause said severing means to sever the length of tape applied to said surface from the remainder of said tape on said roll; and a roll rotatable on said actuating member and engageable with said surface, said roll being operative to effect relative pivotal movement between said casing and said actuating member when said casing is tilted with respect to said surface to actuate said tape severing means.

11. A device for applying adhesive tape to a surface, including: a hollow casing provided with an opening; means for rotatably supporting a roll of tape within said casing to adapt the tape to be unwound from said roll, the end of said tape passing outwardly through said opening; a roller rotatable on said casing adjacent said opening over which said tape is adapted to pass to said surface, said roller being adapted to press said tape against said surface when the device is moved along said surface; a holder member pivoted within said casing and extending rearwardly therefrom; a tape severing blade carried by said holder member and provided with pointed teeth; lugs on said holder member; an actuating member pivoted on said casing rearwardly of said holder member and provided with forwardly extending arms and rearwardly extending arms, said forwardly extending arms overlying said lugs; and a roll rotatable between said rearwardly extending arms and engageable with said surface, said roll being operative to effect relative pivotal movement between said casing and said actuating member when said casing is tilted rearwardly to effect relative pivotal movement between said holder member and said casing in a direction to cause said teeth to perforate said tape, forward movement of said device while in tilted position acting to break the portions of said tape between said perforations.

12. A device as defined in claim 11 and including spring means operative to normally pivot said tape severing means and said actuating member to inoperative position.

13. A device as defined in claim 11 in which said tape severing blade is pivoted on the axis of rotation of said roller and is disposed rearwardly of said roller and adjacent thereto so as to sever said tape rearwardly of said roller, the severed end of the remainder of said tape remaining against said roller and thus being readily available for application to a surface when the device is subsequently moved therealong.

14. A device for applying adhesive tape to a surface, comprising: a hollow casing provided with an opening; means for rotatably supporting a roll of tape within said casing to adapt the tape to be unwound from said roll, the end of said tape passing outwardly through said opening; a roller rotatable on said casing adjacent said opening over which said tape is adapted to pass to said surface, said roller having peripheral flanges at its ends adapted to press the edges only of said tape against said surface when the device is moved along said surface; severing means pivoted on said casing and adapted, when pivoted in one direction to sever a length of said tape applied to said surface from the remainder of tape on said roll; and actuating means movable on said casing and normally disposed to engage said surface and adapted to be moved in response to relative pivotal movement between said casing and said surface, said actuating means being operatively connected to said severing means so that movement of said actuating means causes pivotal movement of said severing means in said one direction.

BRUCE BURNS.

REFERENCES CITED

The following references are of record in the file of this patent:

UNITED STATES PATENTS

| Number | Name | Date |
| --- | --- | --- |
| 971,133 | Maynes | Sept. 27, 1910 |
| 1,135,846 | Rickon | Apr. 13, 1915 |
| 1,178,358 | Thomas | Apr. 4, 1916 |
| 2,057,061 | Eggerss | Oct. 13, 1936 |
| 2,119,537 | Halpin | June 7, 1938 |
| 2,235,704 | Gorbatenko et al. | Mar. 18, 1941 |
| 2,314,504 | Lifschultz | Mar. 23, 1943 |
| 2,400,435 | Nelson | May 14, 1946 |
| 2,452,584 | Luebkeman | Nov. 2, 1948 |

FOREIGN PATENTS

| Number | Country | Date |
| --- | --- | --- |
| 14,029 | Great Britain | 1913 |